United States Patent [19]

Elliott

[11] Patent Number: 4,569,502
[45] Date of Patent: Feb. 11, 1986

[54] PINCH VALVE

[75] Inventor: William H. Elliott, Tucson, Ariz.

[73] Assignee: Miller Sales & Engineering, Inc., Tucson, Ariz.

[21] Appl. No.: 647,354

[22] Filed: Sep. 4, 1984

[51] Int. Cl.$^4$ .............................................. F16K 7/06
[52] U.S. Cl. ......................................... 251/8; 251/6; 251/7; 251/9
[58] Field of Search .......................... 251/6, 7, 4, 9, 5; 137/355.18; 222/214, 207, 215, 439, 452

[56] References Cited

U.S. PATENT DOCUMENTS

| | | | |
|---|---|---|---|
| 2,510,910 | 6/1950 | Schulpen | 251/6 X |
| 2,721,052 | 10/1955 | Hull | 251/6 |
| 2,869,816 | 1/1959 | Olander | 251/6 |
| 2,890,855 | 6/1959 | Little | 251/9 X |
| 3,460,797 | 8/1969 | Allenbaugh, Jr. | 251/9 |
| 3,693,932 | 9/1972 | Blohm | 251/6 |
| 3,881,641 | 5/1975 | Pliml, Jr. et al. | 222/214 X |
| 4,172,580 | 10/1979 | Raftis et al. | 251/7 X |
| 4,407,434 | 10/1983 | Kempf | 251/7 X |

Primary Examiner—Larry Jones
Attorney, Agent, or Firm—Gregory J. Nelson

[57] ABSTRACT

A mechanically actuated pinch valve having a longitudinally extending flexible valve body with an inlet and an outlet and frame members extending along either side of the valve. Side plates are pivotally attached at each side frame. A lower pinch bar or roller extends between the side plates at the lower side of the valve body. A pair of arms are pivotally attached to the side plates and carry an upper pinch bar. The valve is actuated by means of a lever attached to the arms which simultaneously cause the pivot plates to rotate while bringing the upper pinch bar into compressing engagement with the valve body. In other embodiments the actuator mechanism may include a compound linkage or a lead screw for improved control and better mechanical advantage.

6 Claims, 9 Drawing Figures

FIG. 1

PINCH VALVE

The present invention relates to valves for controlling flow of fluids and more particularly relates to an improved pinch valve in which a pair of opposed pinch rollers are moved toward and away from each other to effect a "pinching" valve action in a valve body consisting of a flexible tube or conduit.

Pinch type valves are widely employed to control the flow of various types of fluids as well as dry products which exhibit fluid-like characteristics. These valves are extensively used in the mining industry, brewery industry and the handling and control of dry, abrasive and granular materials such as concrete, flour and the like. Pinch valves are generally used for lower pressure applications and have gained wide acceptability because of their simplicity of construction and ease of maintenance and reliability.

Pinch type valves are generally constructed having a cylindrical, elastomeric sleeve known comprising the valve body which when compressed or "pinched" at an intermediate location restricts or stops flow through the body. The pinching of the valve is usually accomplished by mechanical means comprising a pair of opposed pinch bars or rollers one or both of which may be movable. Basic pinch valve constructions are represented in the patents to Little, U.S. Pat. Nos. 2,841,357 and 2,890,855. In addition, various mechanical linkages for opening and closing the valves are shown in U.S. Pat. Nos. 3,197,173 and 4,073,467.

The present invention provides a pinch valve which is economical to manufacture and the actuation of which is accomplished through an advantageous and efficient mechanical linkage. Various embodiments of the invention are described herein. Briefly, the present invention provides a pinch valve having an elongate generally cylindrical elastomeric valve body which is connected at its opposite ends to appropriate fittings. Side frame members extend axially between the fittings along the opposite sides of the valve body. A lower pinch bar extends transversely between two pivot plates located at either side of the valve body. The plates are pivotally connected to the side frame members at a lower connection point. An actuator assembly is attached to the pivot plates at an elevation above the lower pinch bar and the lower pivot location. The actuator assembly includes a generally U-shaped bracket having an upper pinch bar extending transversely thereacross. A handle member extends from the actuator assembly and in a non-actuated position, the upper and lower pinch bars are disposed at opposite upper and lower sides of the flexible valve body. Rotation of the actuating lever or handle in a closing direction will rotate the side plates and bring the pinch bars to a closed position. In other embodiments of the present invention, the actuator comprises a lead screw and crank mechanism. In still another embodiment, the actuator comprises a compound lever.

FIG. 1 is an exploded perspective view of a preferred embodiment of the pinch valve of the present invention;

Figure 1:
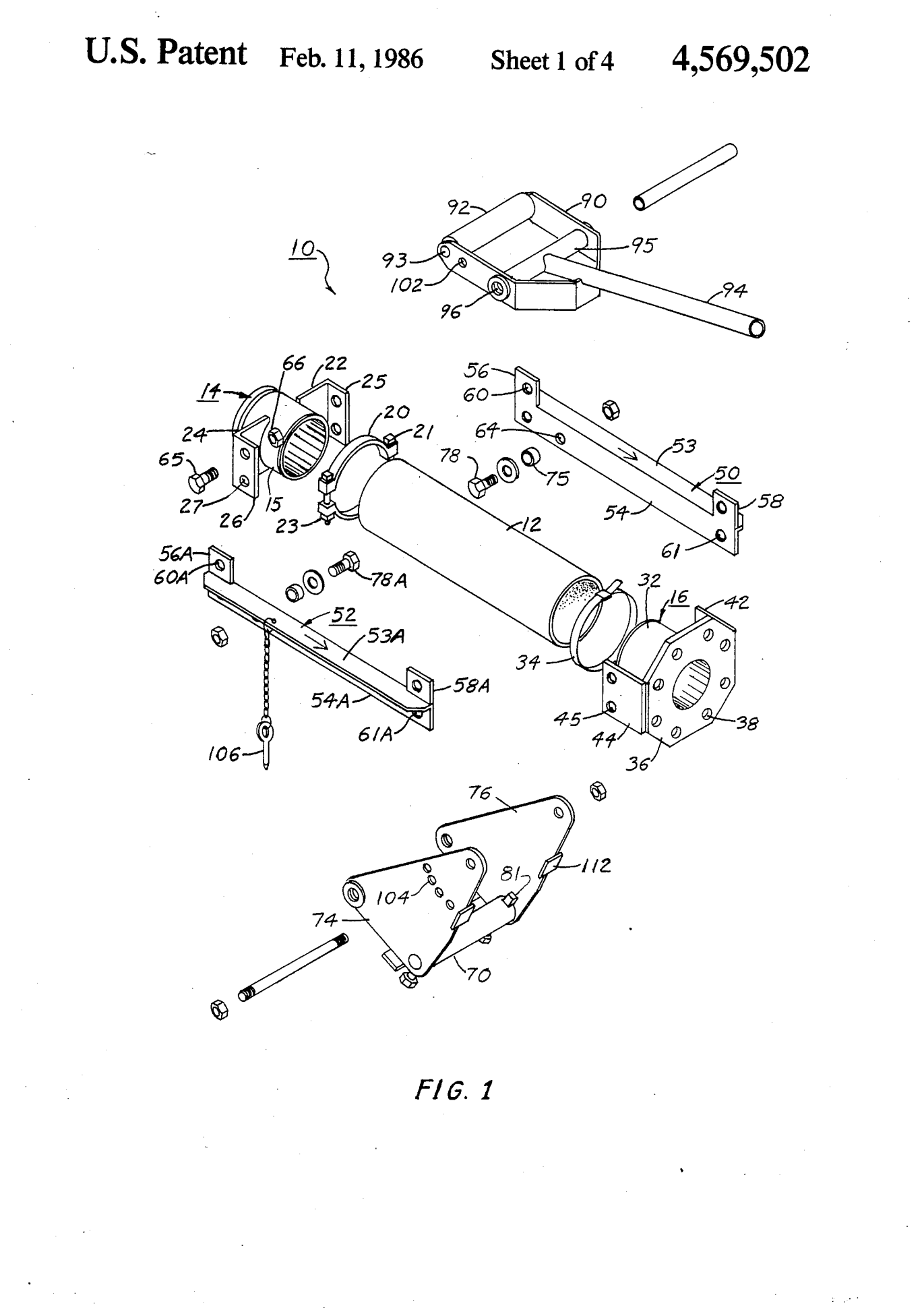
Figure 2:
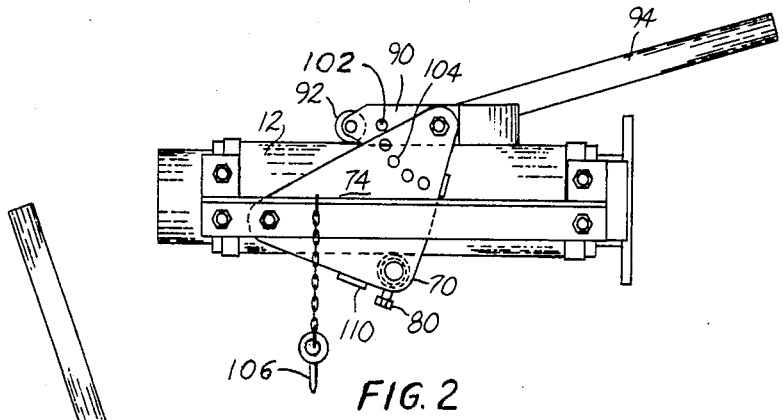
FIG. 2 is a side view of the pinch valve in an open position.

Turning to the drawings, particularly FIGS. 1 to 4, the pinch valve of the present invention is generally designated by the numeral 10 and includes an axially extending generally cylindrical valve body 12. The valve body 12 consists of an elastic tubular member that is engaged about inlet fitting 14 and outlet fitting 16. Inlet fitting 14 has a generally cylindrical body 15 which is adapted to be received within one end of valve body 12 and held in place by a cooperating pair of semi-circular hose clamps 20 which are tightened in place by bolts 21 which are in threaded engagement with nuts 23. A pair of brackets 22 and 24 extend oppositely from the inlet fitting. Each of the brackets is generally L-shaped having legs 25 and 26, respectively, which extend axially to the support side members at bolt holes 27.

Outlet fitting 16 is similarly constructed having a generally circular body 32 which is adapted to be received within the outlet end of the valve body 12. A hose clamp 34 extends about the discharge end of the valve body in the area of engagement of the valve body 12 and the body 32 of the discharge fitting to secure the two together. The valve outlet 16 is provided with a flange 36 having a plurality of circumferentially spaced holes 38 to permit the flange to be bolted to a line fitting. A pair of axially extending ears or tabs 42 and 44 extend from opposite sides of the flange 36 in alignment with legs 25 and 26 of the inlet fitting for attachment to the side frame members 50 and 52 at bolt holes 45. The configuration and size of the inlet and outlet fittings may vary with the particular application.

Side frame members 50 and 52 extend axially along opposite sides of the valve body between the inlet and outlet fittings. Member 50 consists of an angle having vertical leg 54 and horizontal leg 53 with mounting bracket 56 at the inlet end and bracket 58 at the outlet end. Appropriate holes 60 are provided in bracket 56 for attachment to the inlet end. Similarly, holes 62 are provided in the mounting bracket at the outlet end for attachment to the outlet or discharge fitting 16. A bore or aperture 64 is provided in the axially extending member 50 at a location offset toward the inlet end. As will be more fully explained hereafter, the actuator assembly is pivotally attached to the side members at this location. Side frame member 52 is similarly constructed with like or similar elements designated by the same numeral with an appended letter A.

Each of the side members 50 and 52 is attached to the inlet end of the valve by an appropriate fastener shown as a bolt 65 secured at nut 66 which extends through the aligned holes 60 in bracket 56 and hole 25 in bracket 22 and holes 60A in bracket 56A with holes 27. Similarly, the opposite ends of the side members 50 and 52 are secured to the discharge fitting by an appropriate mechanical fastener, not shown, extending through hole 61 and bracket 58 and aligning mounting holes in bracket 42. Side member 52 is similarly attached so the two side members extend axially along the valve body at an elevation below the axial center line of the valve body.

Figure 4:
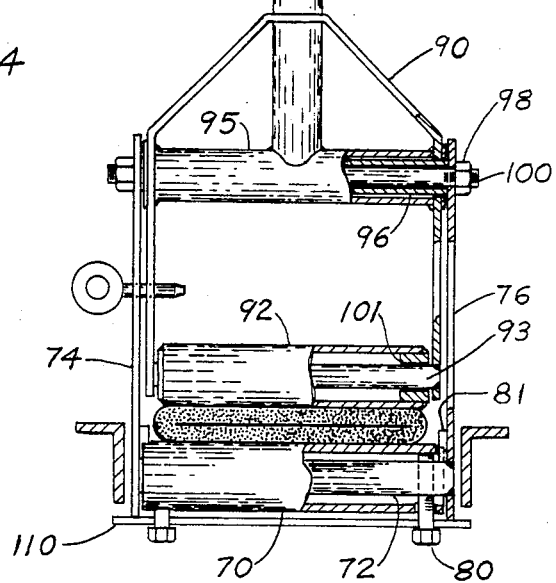
FIG. 4 is a sectional view taken along lines 4—4 of FIG. 3.

As best seen in FIG. 4, the lower pinch bar 70 is carried on shaft 72 which extends transversely between side pivot plates 74 and 76. Pivot plates 74 and 76 are shown as each being generally triangular with each of the plates being pivotally secured at opposite sides of the valve body at bores 64 and 64A by bolts 78 and 78A which include an appropriate bearing insert 75. In the open position as shown in FIG. 2, the lower pinch bar 70 is in non-deforming engagement with the lower edge of the valve body 12. Slight adjustment of the vertical position of the lower pinch bar 70 may be accomplished through bolts 80 which are in threaded engagement with shaft 72 and engage the interior of the pinch bar 70. Rotation of the bolts will cause the vertical position of bar 70 to vary. The pinch bar 70 is preferably made of a steel pipe or tubing sections.

The means for rotating the pinch valves into a flow blocking or flow closing position comprises a hand lever actuator including a generally U-shaped bracket member 90 which at its open end carries the upper pinch bar 92. The upper pinch bar 92 is preferably made of a section of pipe which is rotatably mounted on shaft 93 at bearing inserts 101 as best seen in FIG. 4. A handle or lever 94 extends axially through the bight of the bracket member and is secured at its inner end to a fixed shaft 95 extending transversely across the bracket 90 parallel to the pinch roller 92. Shaft 95 defines an interior bore 96 which receives transversely extending pivot shaft 100. Shaft 100 extends through the opposite side plates 74 and 76 and is secured by nuts 98 at threaded end section 100. Thus bracket 90 is pivotally mounted relative to the opposite side pivot plates.

As seen in FIG. 2, a locking hole 102 is provided in the leg of the bracket 90 intermediate the pivot location 100 and roller 92. A plurality of mating locking holes 104 are provided in side plate 74 arranged along an arcuate path so that locking pin 106 may be engaged in the holes 102 and 104 to secure the pinch members in a selected position.

As illustrated in FIG. 2, the upper and lower pinch members lie in non-deforming engagement with the upper and lower surfaces of the valve body 12 with the valve in an open position. In this position, the actuating lever 94 extends at a generally acute angle with respect to the axial center line of the valve in the direction of flow. The pinch valve members 92 and 70 are axially offset with respect to one another.

The operation of the valve is effected by movement of the hand lever 94. As the hand lever 94 is moved counter-clockwise as seen in FIG. 2, pinch bar 92 will rotate downwardly about pivot point 100 deforming the upper portion of the valve body 12. Simultaneously, lower pinch member 72 carried on the side plates rotates upwardly about pivot members 74 and 74A deforming the valve body 12 from the lower side. As valve body is deformed, the flow area decreases. At any selected location intermediate position or at full closed, the valve may be secured by placement of pivot pin 106 in aligning holes 102 and 104.

Figure 3:
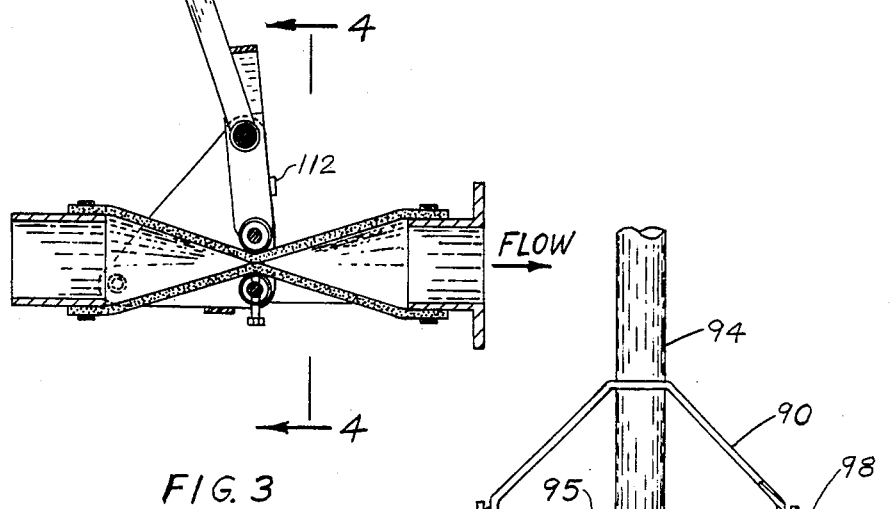
FIG. 3 is a partial sectional view in elevational showing the valve in a closed position.
Figure 6:
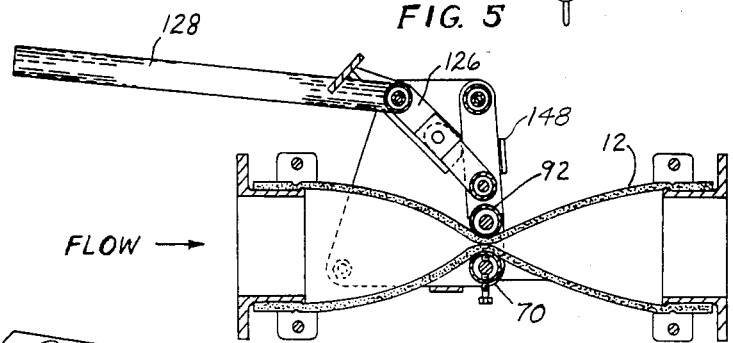
FIG. 6 is a side view partly in section showing the valve of FIG. 5 in a closed position.

When the valve pinch bars fully compress the valve body member as seen in FIG. 6, the bracket 90 is in a slightly over-center position. In this position, the force exerted by the fluid within the valve body upstream of the valve 10 imposes a force holding the valve in a closed position. In order to stabilize the valve in a closed position, a stop member 110 in the form of a bar extends transversely between the lower edges of the side plate and in a closed position bar 110 will engage the lower edge of the side plates 54 and 54A. Similarly, stop member 112 projects inwardly from the vertical sides of the side plates and engage the side bracket 90 in the fully closed position as seen in FIG. 3.

Figure 5:
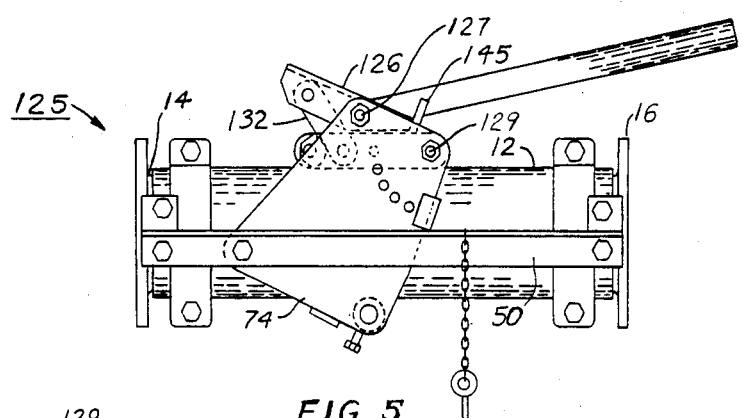
FIG. 5 is a side view of an alternate embodiment of the present invention.
Figure 7:
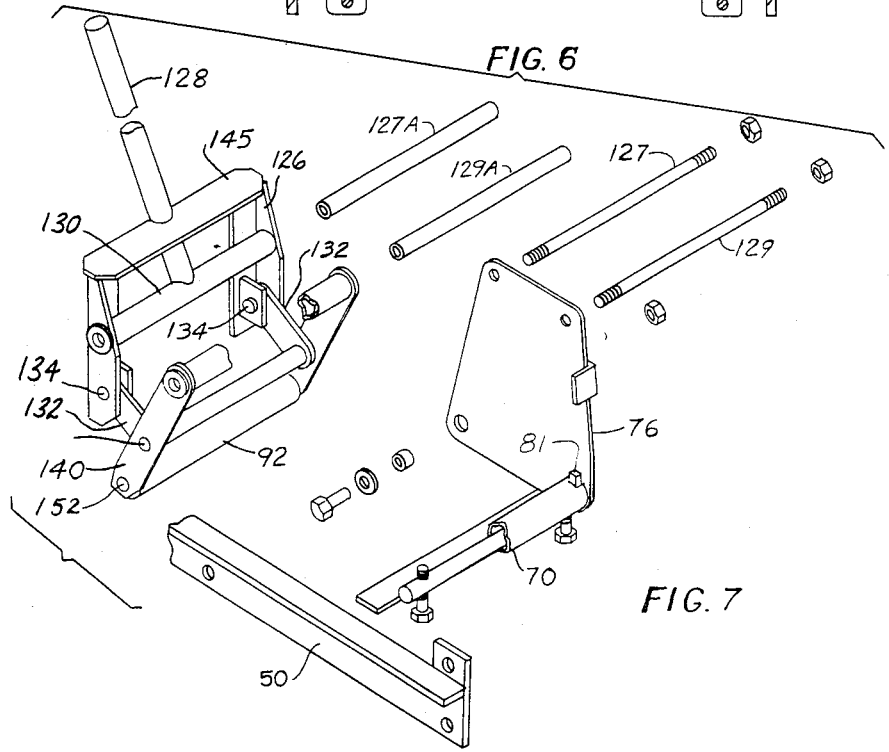
FIG. 7 is an exploded view of the operating mechanism.

FIGS. 5, 6 and 7 illustrate an alternate embodiment of the present invention generally designated by the numeral 125. In embodiment 125, the valve body 12, inlet 14, outlet 16, side plates 50, pivot plates 74 and 76 and pinch bars 92 and 70 are constructed as described with reference to FIGS. 1 to 4. Therefore, additional detailed description of these components is not necessary and similar numbers will be used with reference to embodiment 125 to describe these common elements. Embodiment 125 incorporates a compound lever actuating mechanism which provides positive locking in a closed position. Compound lever assembly includes a pair of actuation bars 126 pivotally secured at pivot shaft 127 which extends between the pivot plates 74 and 76 at the upper edge of the plates. The actuation bars 126 are secured to a handle 128 which is secured to cross piece 130 extending between the oppositely disposed bars 126. A pair of primary links 132 are pivotally connected to bars 126 near their outer ends at pivot 134. The opposite end of links 132 are each pivotally secured at the inner side of a roller link 140 at an intermediate location 141. Roller links 140 have one end pivotally secured to pivot point 129 at the side plates. The opposite end of roller links 140 carry the upper pinch bar 92 which is rotatably carried about transversely extending shaft 152 which extends between the opposite links.

It will be seen that when handle 128 is actuated in a counter-clockwise direction as seen in FIG. 5, the bars 126 will rotate downwardly. Links 140, carrying the pinch bar, will also be caused to be rotated downwardly through link 132. The side plates 74 and 76 which carry the lower pinch bar 92 will be simulataneously caused to rotate upwardly until the rollers or pinch bars assume the closed position in which the upper and lower pinch bars 92 and 70 are adjacent one another and are in alignment at the axial mid-point of the valve body. As seen in FIG. 6, in the closed position, link 132 assumes a position in substantial alignment with bar 126 providing a positive lock in the closed position. Link 140 engages stop 148 in the full closed position. To open the valve, handle 128 is actuated clockwise causing bars 126 to rotate upwardly until a full open position is reached at which time stop 145 engages the roller links 140.

Figure 8:
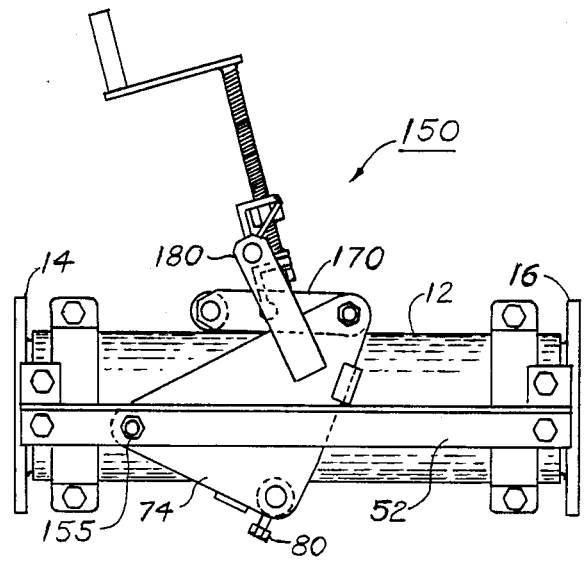
FIG. 8 is a side view of still another embodiment of the present invention.
Figure 9:
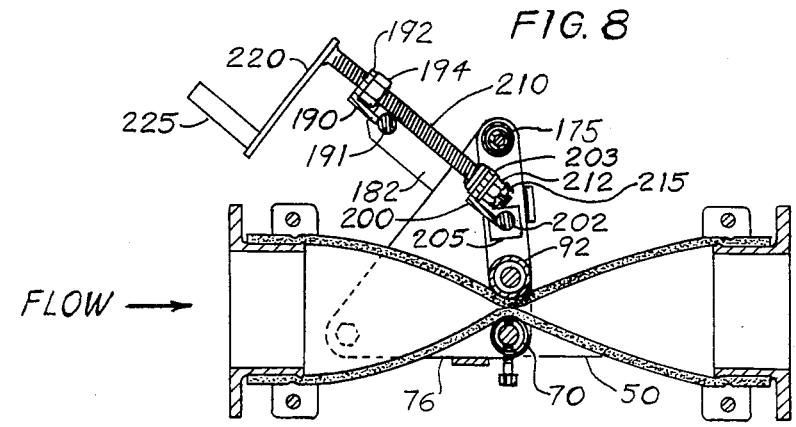
FIG. 9 is a sectional view similar to FIG. 8 showing the valve in a closed position.

FIGS. 8 and 9 show another embodiment generally designated by the numeral 150 in which the pinch valve is operated by means of a screw actuator for higher pressure operation and to provide more precise adjustment. Again, the valve body construction is as has been described with reference to previous figures and repetition of the common constructional elements is not believed necessary and the same numerals have been used in these figures as in previous drawing figures to indicate the same or similar elements. The screw actuator is again carried on frame side plates 74 and 76 which are disposed at opposites sides of the valve body and attached for pivotal movement at pivot points 155. Lower pinch roller 70 extends transversely between the side plates 74 and 76 and in an open position is disposed downstream of pivot point 155 and engages the underside of the flexible valve body. Lower roller 70 is vertically adjustable through bolt 80. The upper pinch roller 92 is rotatably carried on opposite roller arms 170 and 172 which are pivotally connected to side plates 74 and 76 at pivot points 175. Pivot points 175, 155 and the axial centerline of lower pinch bar 70 form a generally triangular configuration which has been described before. The exact geometry of the location of these points will vary with the size of the valve but is selected so that in the open position rollers 70 and 92 each engage the upper and lower sides of the valve body and in the fully closed position are in approximate alignment fully compressing the valve body.

A screw actuator assembly is carried on a support comprising brackets 180 and 182 extending from the outer side of each of the respective side plates 74 and 76 at an acute angle with respect to the axial center line of the valve. Mounting bracket 190 in the form of an angle is welded to pivoting shaft 191 which extends transversely between the mounting brackets 180 and 182. Another angle bracket 200 extends transversely between the roller arms 170 and 172 having a leg 201 attached to shaft 202 which has its ends rotably secured in housing members 205 welded to the inside of roll arms 170 and 172. A nut 194 is welded to leg 192 of angle bracket 190. A threaded rod 210 extends in threaded engagement with nut 194 and extends through an opening in leg 203 of angle bracket 200. The end of rod 210 is in threaded engagement with hexnut 212 which is secured to the rod by an appropriate cotter pin 215. The opposite end of rod 210 is provided with a crank 220 and handle 225. It will be apparent that upon actuation of the rod by means of screw and crank, the roller arms and pivot plate will be rotated between the open and closed position.

To the closed position as seen in FIG. 9, pivot plates 74 and 76 have been rotated to bring pinch bar 70 into engagement with the valve body and bar 92 similarly compresses the valve body. Any intermediate flow controlling position can be achieved by actuation of the screw rod through handle 225.

It will be obvious to those skilled in the art to make various changes, alterations and modifications to the invention described herein. To the extent that these changes, alterations and modifications do not depart from the spirit and scope of the appended claims, they are intended to be encompassed therein.

I claim:

1. In a pinch valve of the type having a longitudinally extending flexible valve body having an inlet and outlet and frame member extending longitudinally along the body at opposite sides thereof, the improvement comprising:
   (a) a pair of pivot plates disposed at opposite sides of the valve body each being pivotally secured to one of the said frame members;
   (b) a first pinch bar extending transversely between said pivot plates at a first side of said valve body;
   (c) arm means pivotally secured at one end to each of said pivot plates at a location at a second side of said valve body said arm means comprising a bracket having surfaces extending on opposite sides of the valve body and generally in the direction of the length of the valve body;
   (d) a second pinch bar extending transversely between said bracket surfaces; and
   (e) actuator means for pivoting said bracket and simultaneously pivoting said side plates to move said pinch bars toward each other and into a flow controlling position compressing the flexible valve body equally at opposite sides thereof.

2. The pinch valve of claim 1 wherein said actuator means comprises a lever secured to said arm means at said pivot point.

3. The pinch valve of claim 1 wherein said arm means comprises a compound linkage and said actuator comprises a lever coupled to said linkage.

4. The pinch valve of claim 1 wherein said actuator means comprises a lead screw operatively connected to said arm means.

5. The pinch valve of claims 2, 3 or 4 further including stop means to limit the travel of said pivot plates and said arm means.

6. The pinch valve of claims 2, 3 or 4 wherein said pinch bars comprise rollers and including means for adjusting the horizontal position of the same.

* * * * *